(12) United States Patent
Terree et al.

(10) Patent No.: US 11,443,403 B2
(45) Date of Patent: *Sep. 13, 2022

(54) IMAGE AND VIDEO PROCESSING USING MULTIPLE PIPELINES

(71) Applicant: GoPro, Inc., San Mateo, CA (US)

(72) Inventors: Etienne Terree, Fontenay-aux-Roses (FR); Jerome Labarthe, Bezons (FR); Romain Gounelle, Haut de Seine (FR); Anandhakumar Chinnaiyan, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/097,399

(22) Filed: Nov. 13, 2020

(65) Prior Publication Data

US 2021/0125304 A1 Apr. 29, 2021

Related U.S. Application Data

(63) Continuation of application No. 16/572,915, filed on Sep. 17, 2019, now Pat. No. 10,861,127.

(51) Int. Cl.
| | |
|---|---|
| *G06T 1/20* | (2006.01) |
| *G06T 3/40* | (2006.01) |
| *G06T 5/00* | (2006.01) |
| *G06T 1/00* | (2006.01) |
| *G06F 9/38* | (2018.01) |
| *G06T 3/60* | (2006.01) |
| *G06V 20/00* | (2022.01) |
| *G06T 1/60* | (2006.01) |

(52) U.S. Cl.
CPC .............. *G06T 1/20* (2013.01); *G06F 9/3867* (2013.01); *G06T 1/0007* (2013.01); *G06T 3/40* (2013.01); *G06T 3/60* (2013.01); *G06T 5/002* (2013.01); *G06V 20/00* (2022.01); *G06T 1/60* (2013.01); *G06T 5/001* (2013.01); *G09G 2340/06* (2013.01)

(58) Field of Classification Search
None
See application file for complete search history.

(56) References Cited

U.S. PATENT DOCUMENTS

| 5,319,473 A | 6/1994 | Harrington |
| 5,933,137 A | 8/1999 | Anderson |

(Continued)

*Primary Examiner* — Joni Hsu

(74) *Attorney, Agent, or Firm* — Young Basile Hanlon & MacFarlane, P.C.

(57) ABSTRACT

An image captured using an image sensor is processed to determine control statistics and to produce an altered image which can be output for display or further processing at an image capture device, and the image is then processed according to the control statistics to produce a processed image which can be output for display or further processing at the image capture device or at another device. The altered image may have a lower resolution than the processed image. The image may be stored in a buffer. For example, the image may be retrieved from the buffer to produce the altered image, and again retrieved from the buffer to produce the processed image. The altered image may replace the image within the buffer. For example, the processed image may be produced to represent the altered image at a higher resolution.

20 Claims, 16 Drawing Sheets

(56) References Cited

U.S. PATENT DOCUMENTS

| | | | |
|---|---|---|---|
| 7,982,770 B1 | 7/2011 | Kahn | |
| 9,819,852 B2* | 11/2017 | Prentice | H04N 5/23245 |
| 9,836,484 B1 | 12/2017 | Bialynicka-Birula | |
| 9,836,819 B1* | 12/2017 | Donsbach | G06K 9/00228 |
| 11,016,560 B1* | 5/2021 | Wenger | H04N 13/344 |
| 2006/0268360 A1 | 11/2006 | Jones | |
| 2009/0135264 A1* | 5/2009 | John | H04N 1/00925 |
| | | | 348/220.1 |
| 2010/0045820 A1 | 2/2010 | Prieto | |
| 2011/0268328 A1 | 11/2011 | Bar-Aviv | |
| 2012/0278347 A1 | 11/2012 | Foster | |
| 2013/0021504 A1 | 1/2013 | Plowman | |
| 2013/0230294 A1* | 9/2013 | Sassa | H04N 5/77 |
| | | | 386/224 |
| 2014/0063314 A1* | 3/2014 | Sankaranarayanan | |
| | | | H04N 5/247 |
| | | | 348/333.02 |
| 2018/0191993 A1* | 7/2018 | Gera | H04N 5/77 |
| 2020/0021841 A1* | 1/2020 | Leontaris | H04N 19/176 |
| 2020/0111232 A1* | 4/2020 | Bleyer | G06T 7/74 |

* cited by examiner

IMAGE AND VIDEO PROCESSING USING MULTIPLE PIPELINES

CROSS REFERENCE TO RELATED APPLICATION(S)

This disclosure is a continuation of U.S. patent application Ser. No. 16/572,915, filed Sep. 17, 2019, issued as U.S. Pat. No. 10,861,127 on Dec. 8, 2020, the entire disclosure of which is herein incorporated by reference.

TECHNICAL FIELD

This disclosure relates to image and video processing using multiple pipelines.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. For example, the image signal may undergo processing by one or more processing units of an image processing pipeline, such as to prepare the image signal for display or encoding.

SUMMARY

Disclosed herein are implementations of systems and techniques for image and video processing using multiple pipelines.

One aspect of this disclosure is an image capture device. The image capture device comprises an image sensor, a memory, and a processor. The image sensor is configured to capture an image. The memory is configured to store instructions. The processor is configured to execute the instructions to determine control statistics for the image, produce an altered image representative of the image at a second resolution that is lower than the first resolution, output the altered image for display or further processing, produce a processed image representative of the image at the first resolution according to the control statistics, and output the processed image for display or further processing.

Another aspect of this disclosure is a method. The method comprises obtaining an image captured using an image sensor, using one or more first processes to determine control statistics and to produce an altered image representing the image at a first resolution, outputting the altered image for display or further processing, using one or more second processes to produce a processed image representing the image at a second resolution according to the control statistics, and outputting the processed image for display or further processing.

Yet another aspect of this disclosure is an image processor. The image processor comprises one or more first processing units and one or more second processing units. The one or more first processing units are configured to process an image to determine control statistics and to produce an altered image at a first resolution for display at an image capture device. The one or more second processing units are configured to process the image using the control statistics to produce a processed image at a second resolution for further processing at the image capture device, wherein the second resolution is higher than the first resolution.

These and other aspects of this disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
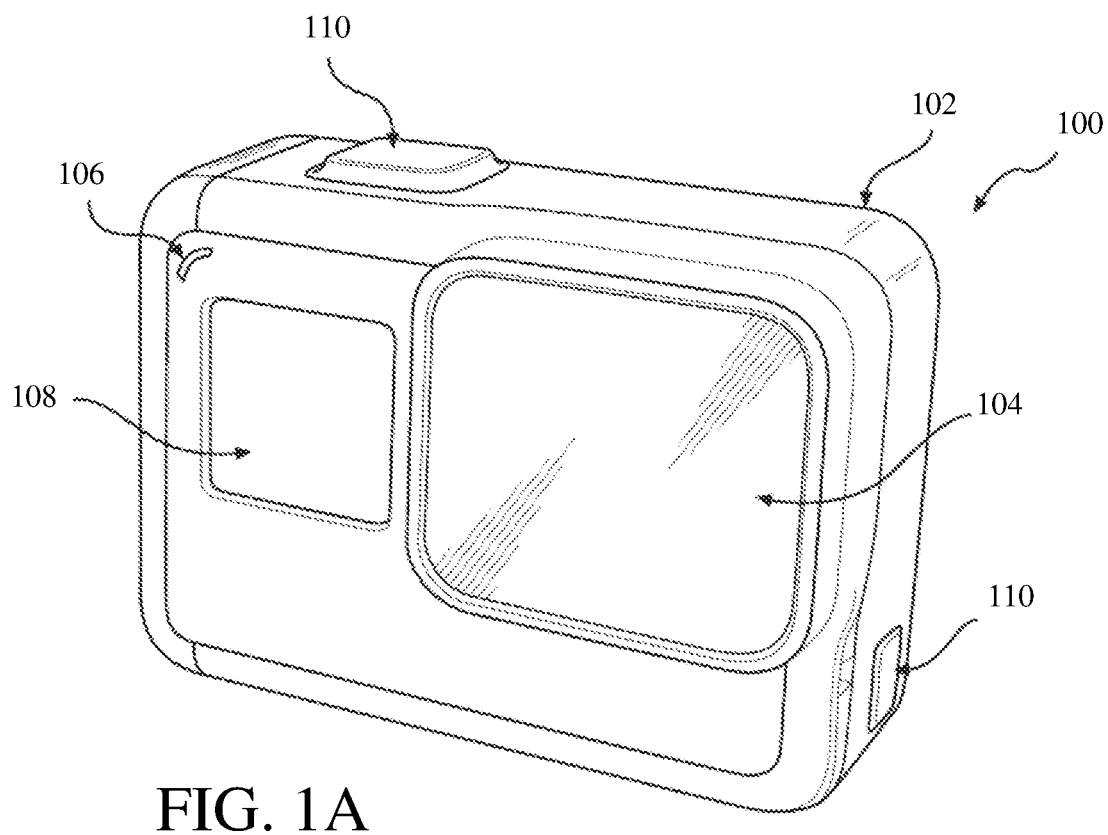
FIGS. 1A-D are isometric views of an example of an image capture device.

A typical image processing pipeline includes capturing an image using an image sensor, processing the image to prepare the image for display or encoding, and outputting the processed image. This processing generally delays the outputting of the processed image, such as because of the original file size of the captured image, the extent of the processing operations performed against the captured image, or both. For example, the typical image processing pipeline may include performing various operations against image data of the captured image to understand how to improve the quality of subsequent images captured using the same image sensor. Those collected control statistics may, for example, indicate how to adjust tone mapping settings, detect image objects, improve object focus, and the like.

However, such a typical image processing pipeline suffers from several drawbacks. First, the adjustments made to improve image quality based on the processing of a current image are not applied to the current image, but only to subsequently captured images. As such, the typical image processing pipeline does not enable improvement of the quality of a current image by adjusting configurations of an image capture device at which the current image is captured. Second, the typical image processing pipeline introduces latency between the capturing of the image and the eventual outputting of the image, such as for display or encoding. This latency may, for example, be caused by the introduction of complex image processing capabilities designed to improve the overall quality of an image based on collected control statistics and the increasingly large file sizes of images.

Implementations of this disclosure address problems such as these using multiple image processing pipelines for delivering image and video content. An image, which may be a still image or a video frame, is captured using a sensor and stored in a buffer. In a first image processing pipeline, the image is retrieved from the buffer and processed according to first configurations using one or more image processing units. The altered image produced using the first image processing pipeline replaces the earlier version of the image stored in the buffer. The altered image may also be immediately output for display or encoding.

In the second image processing pipeline, the altered image is retrieved from the buffer and processed using second configurations using one or more image processing units, which may be the same as or different from the image processing units used in the first image processing pipeline. The altered image processed using then second image processing pipeline may then be encoded. The first and second configurations may include or otherwise refer to configurations or other settings for processing an image. For example, the first and second configurations may include or refer to resolutions. In particular, a first resolution at which the image is processed in the first image processing pipeline may be lower than a second resolution at which the image is processed in the second image processing pipeline.

The use of the multiple image processing pipelines according to the implementations of this disclosure introduce several technical benefits. For example, the first image processing pipeline may be configured to process an image at lower quality (e.g., resolution) than the second image processing pipeline. As a result, the output of the first image processing pipeline may be delivered to a user (e.g., by the outputting thereof to a display) while a higher quality version remains processing at the second image processing pipeline. Furthermore, information about how the image is processed at the first image processing pipelines, such as by the individual image processing tools thereof (which may, for example, be implemented in hardware and/or software units) or a combination of such image processing tools, can be leveraged to improve the processing and/or quality of the image at the second image processing pipeline.

Other examples of technical benefits introduced by the implementations of this disclosure are numerous and include, but are not limited to, preventing unnecessary computing resource spending for rejected images, determining predictive strategies for image stabilization, enabling delayed file-to-file processing to perform computational operations otherwise not achievable during real time streaming processing, enabling the identification and/or selection of an optimal image from a burst of captured images, and enabling zero shutter lag proficiency. The implementations of this disclosure may be used to process images or video.

The implementations of this disclosure are described in detail with reference to the drawings, which are provided as examples so as to enable those skilled in the art to practice the technology. The figures and examples are not meant to limit the scope of the present disclosure to a single implementation, and other implementations are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
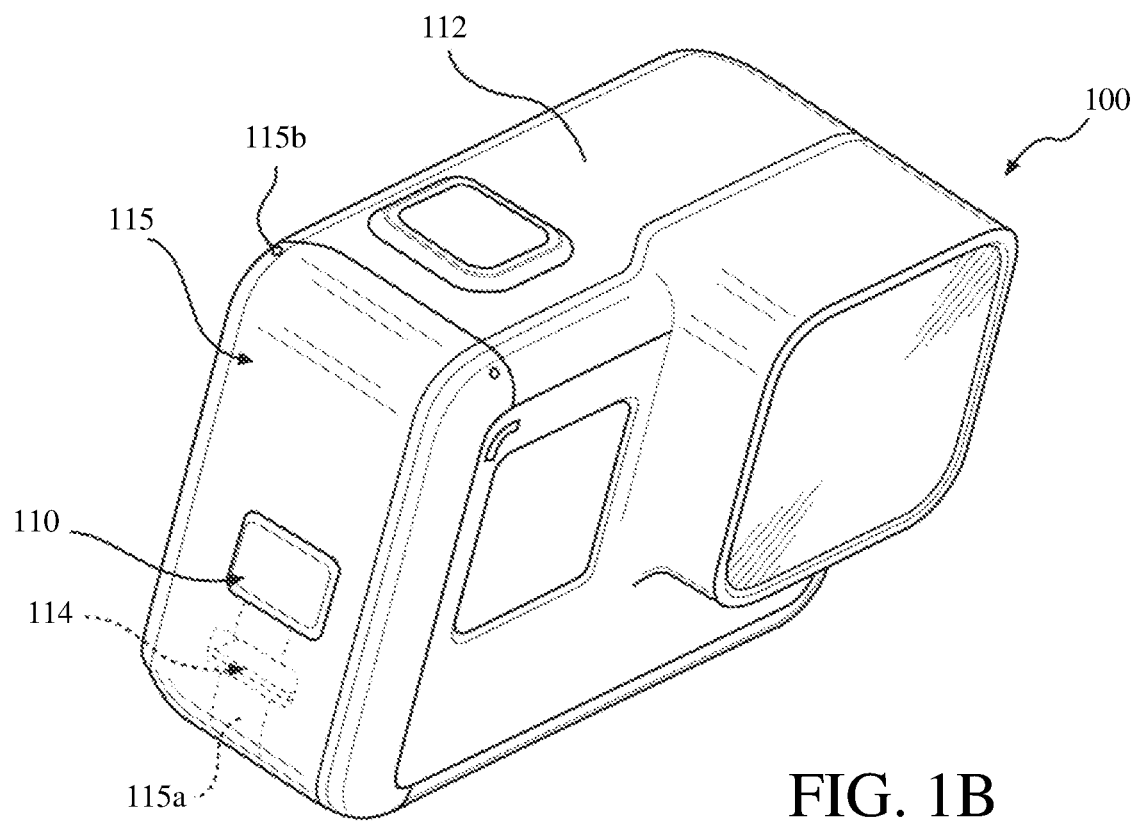
Figure 1C:
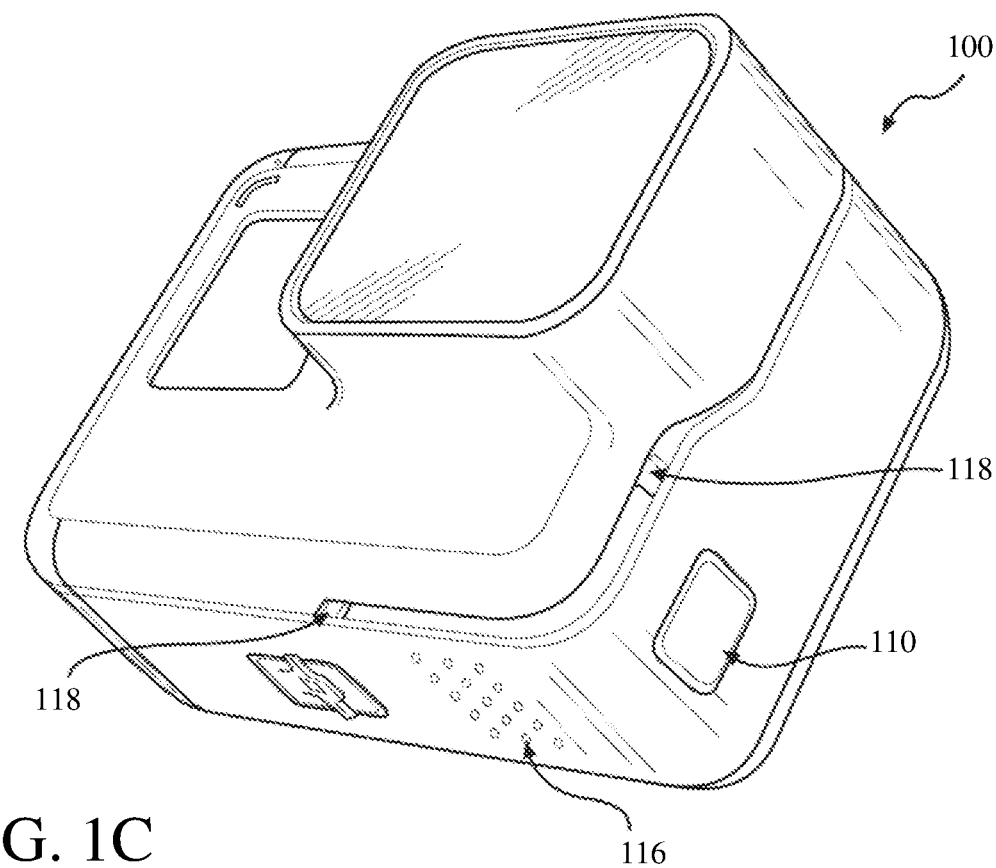
Figure 1D:
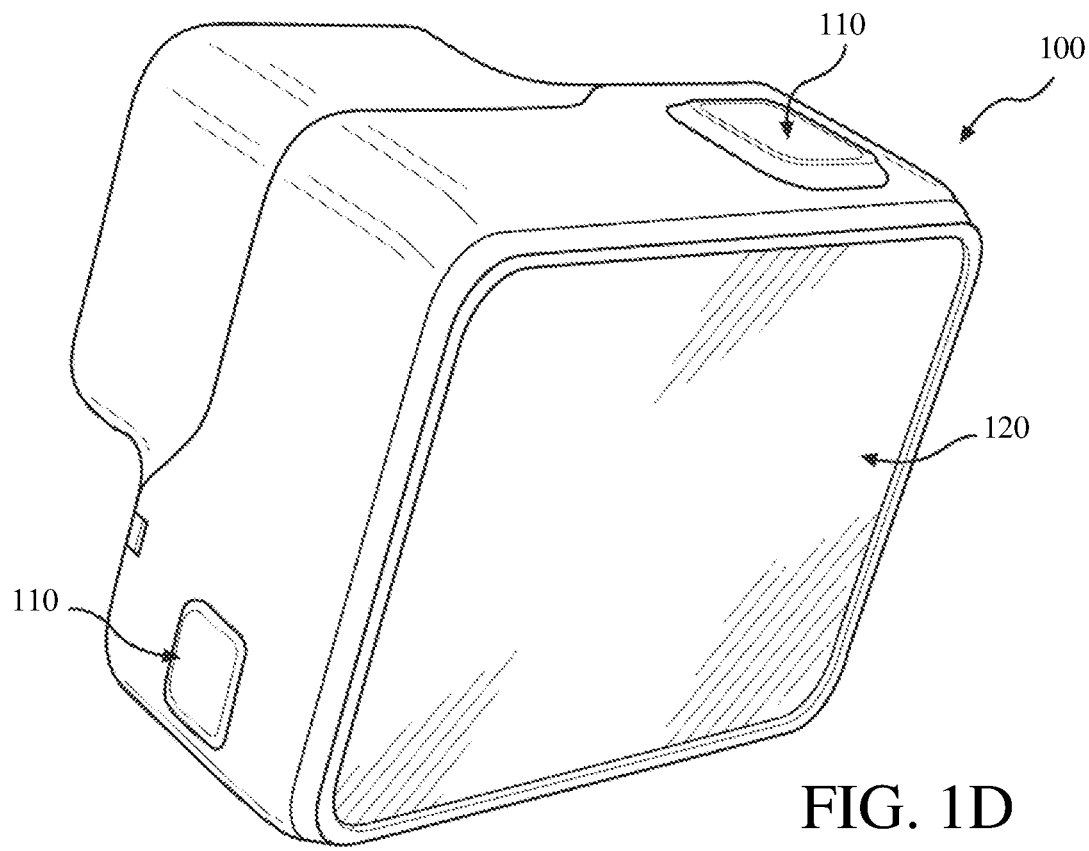

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
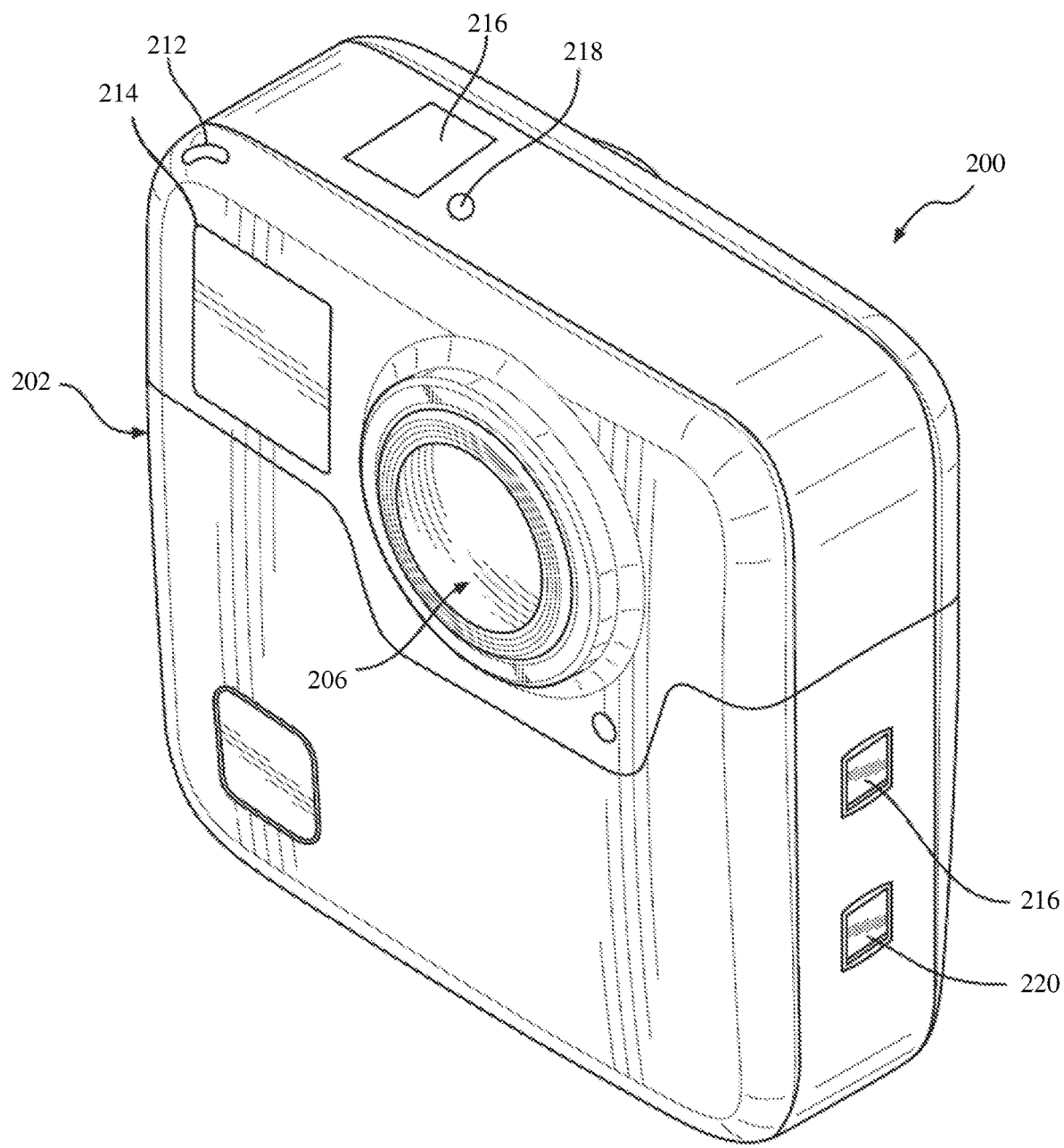
FIGS. 2A-B are isometric views of another example of an image capture device.
Figure 2B:
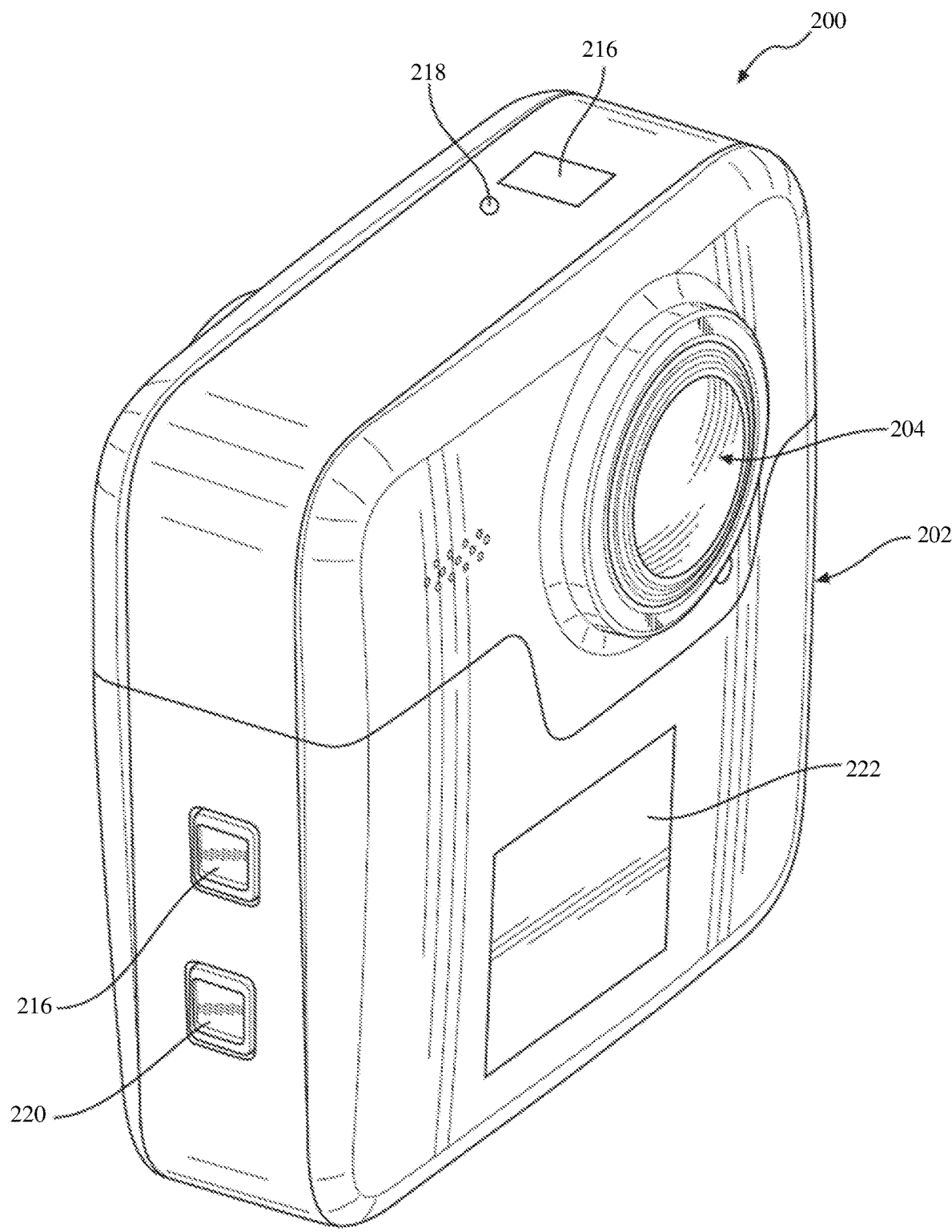

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
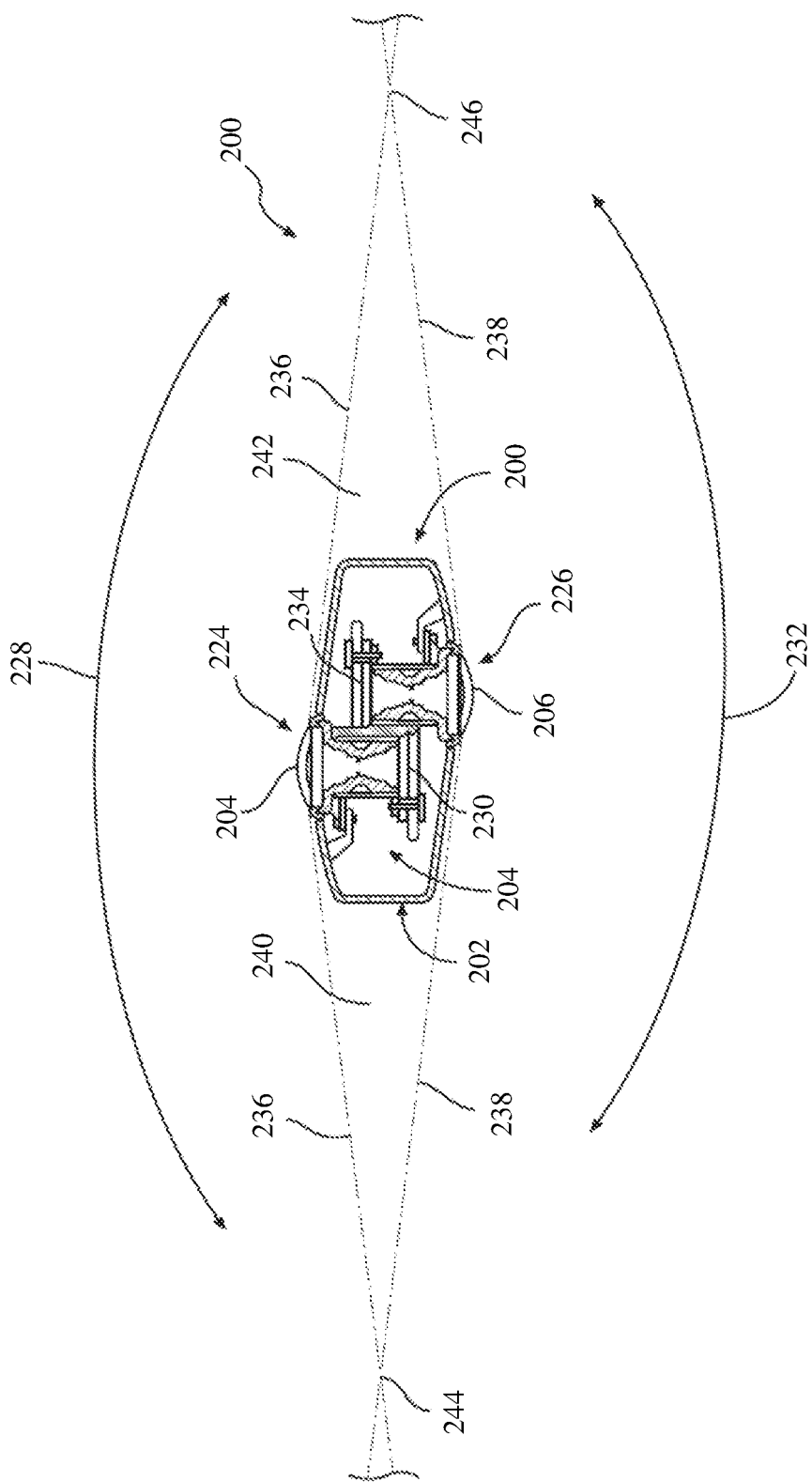
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
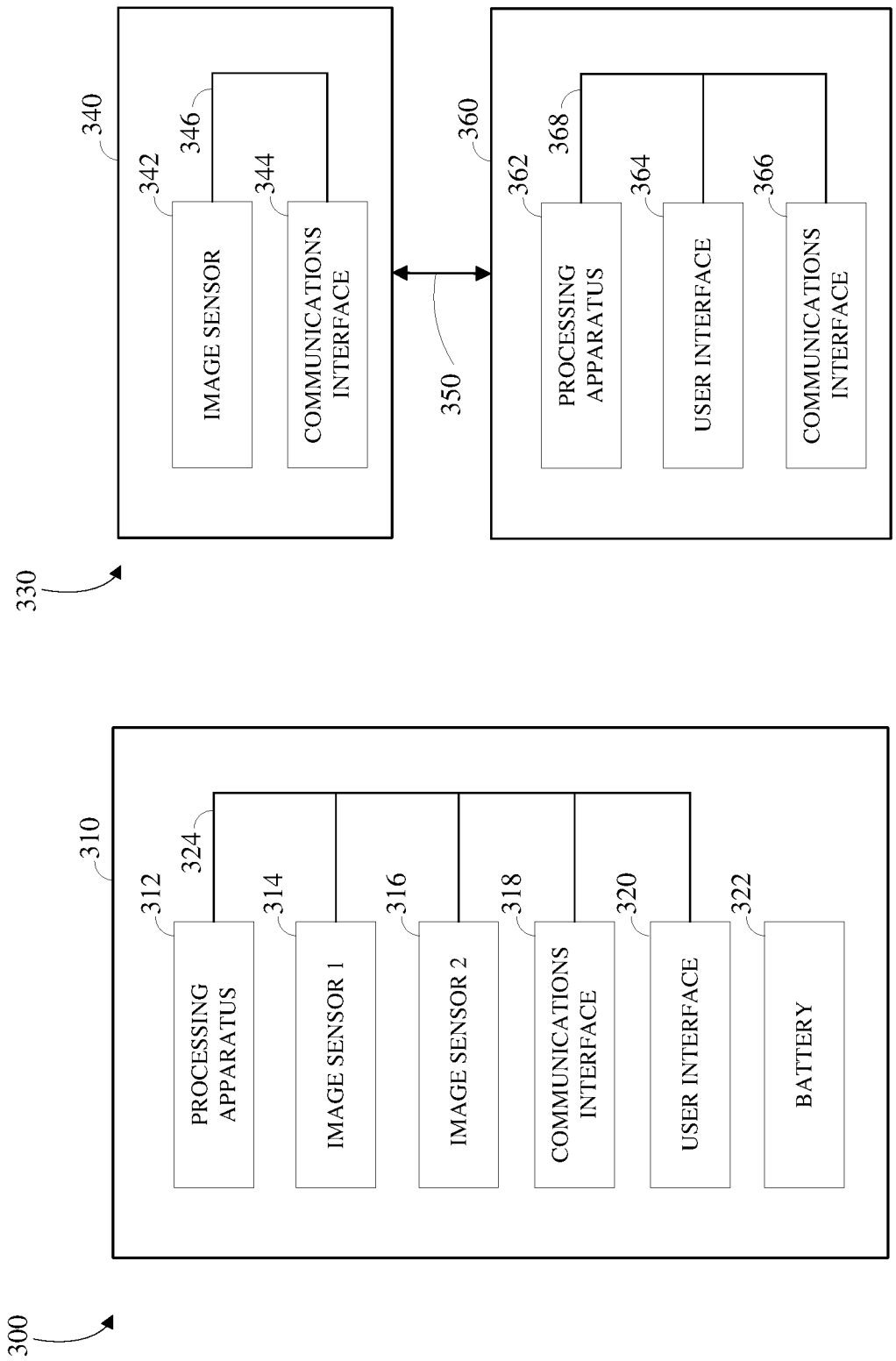
FIGS. 3A-B are block diagrams of examples of image capture systems.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 11:
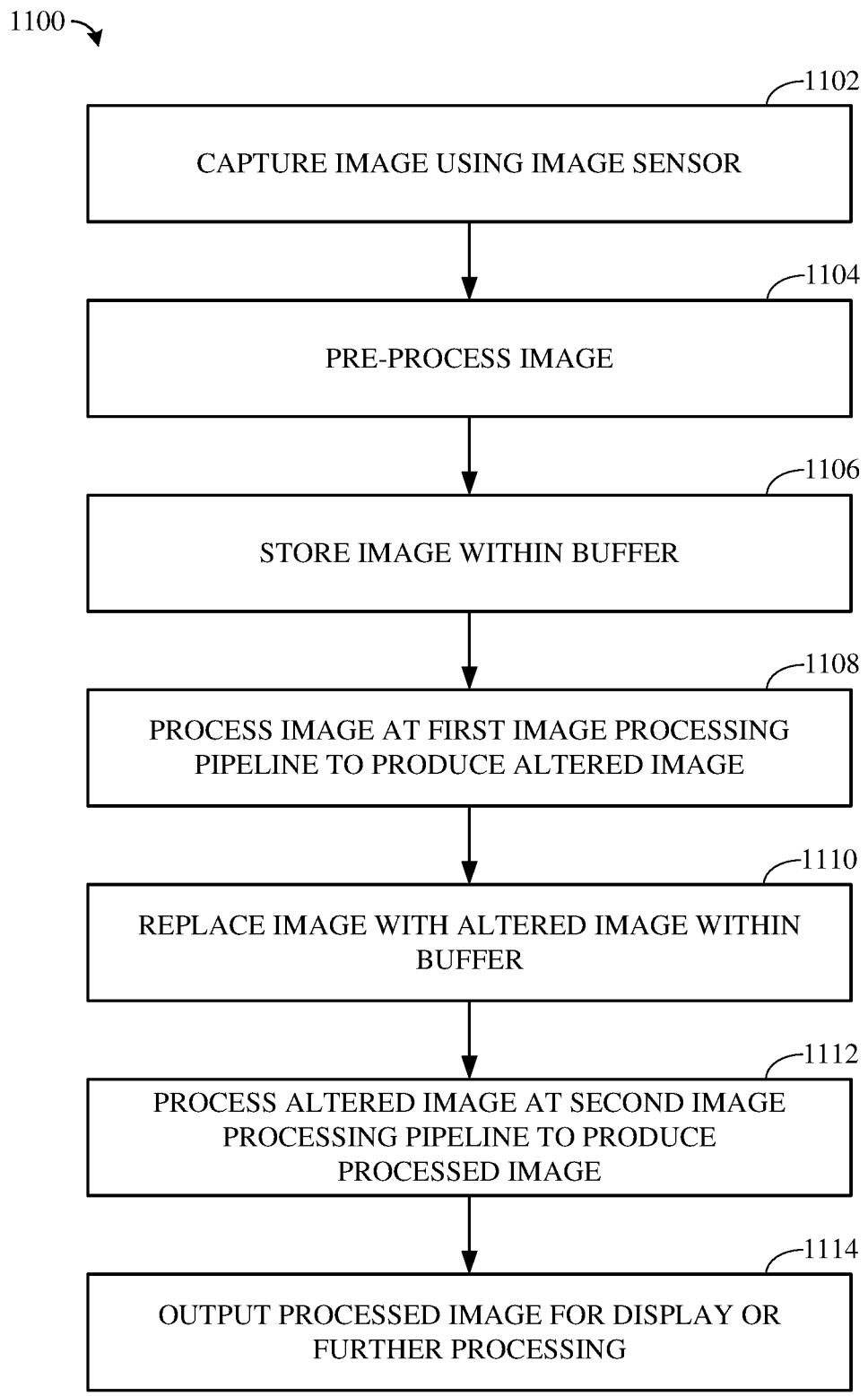
FIG. 11 is a flowchart showing an example of a technique for image and video processing using multiple pipelines.
Figure 12:
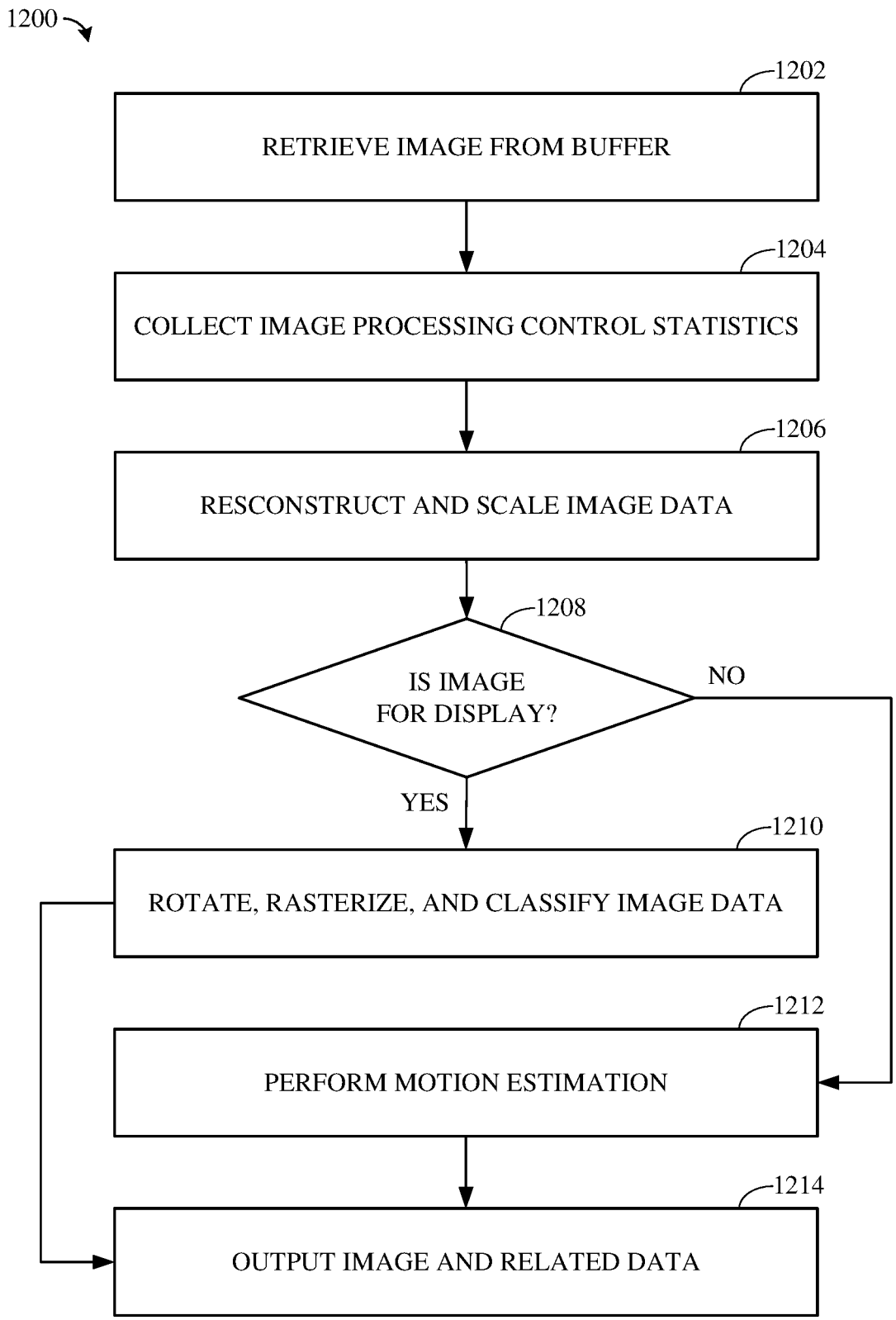
FIG. 12 is a flowchart showing an example of a technique for image and video processing performed at a first image processing pipeline.
Figure 13:
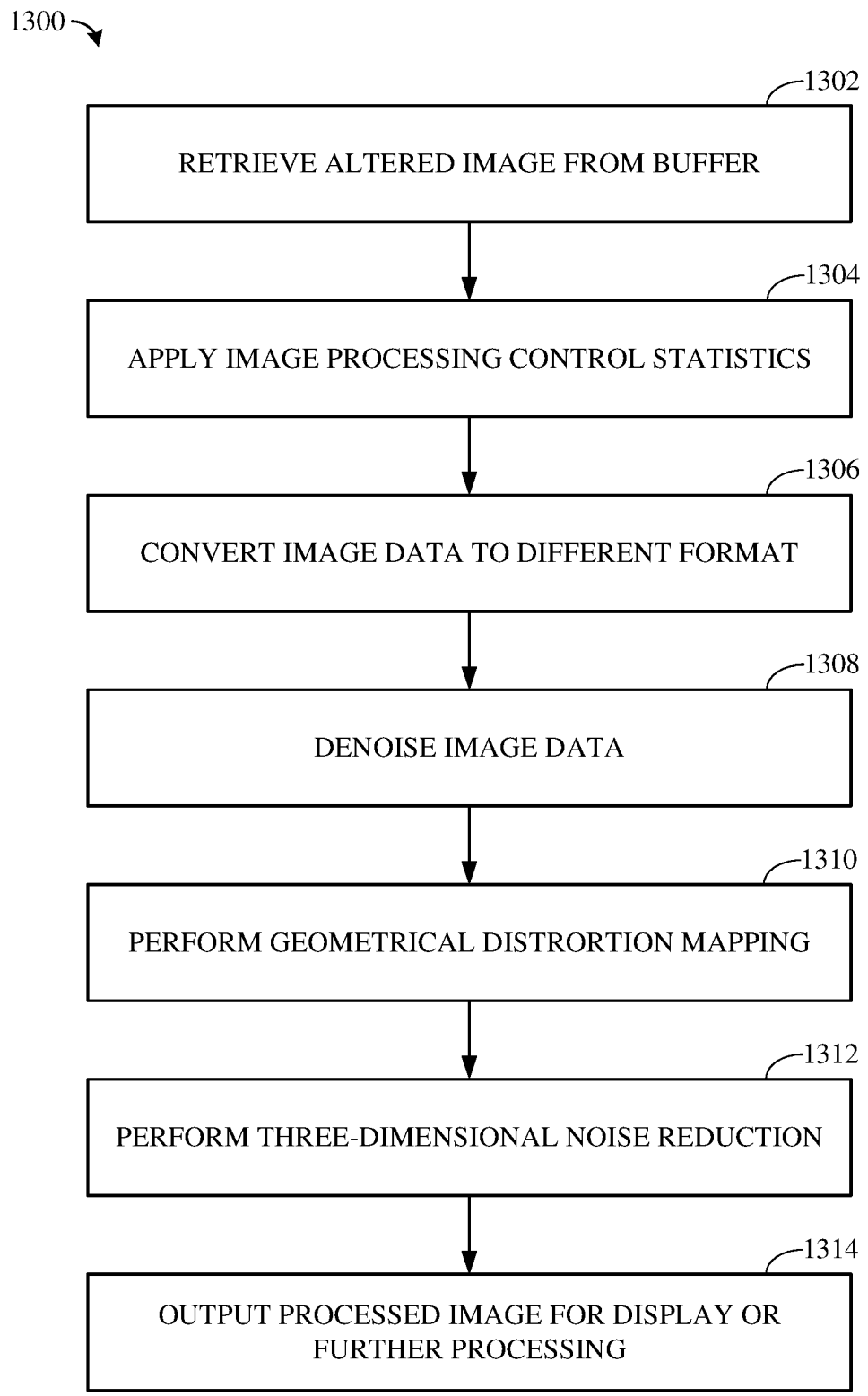
FIG. 13 is a flowchart showing an example of a technique for image and video processing performed at a first image processing pipeline.

The image capture system 300 may be used to implement some or all of the techniques described in this disclosure, such as the technique 1100, the technique 1200, and/or the technique 1300, respectively described with respect to FIGS. 11-13.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique 1100, the technique 1200, and/or the technique 1300, respectively described with respect to FIGS. 11-13.

Figure 4:
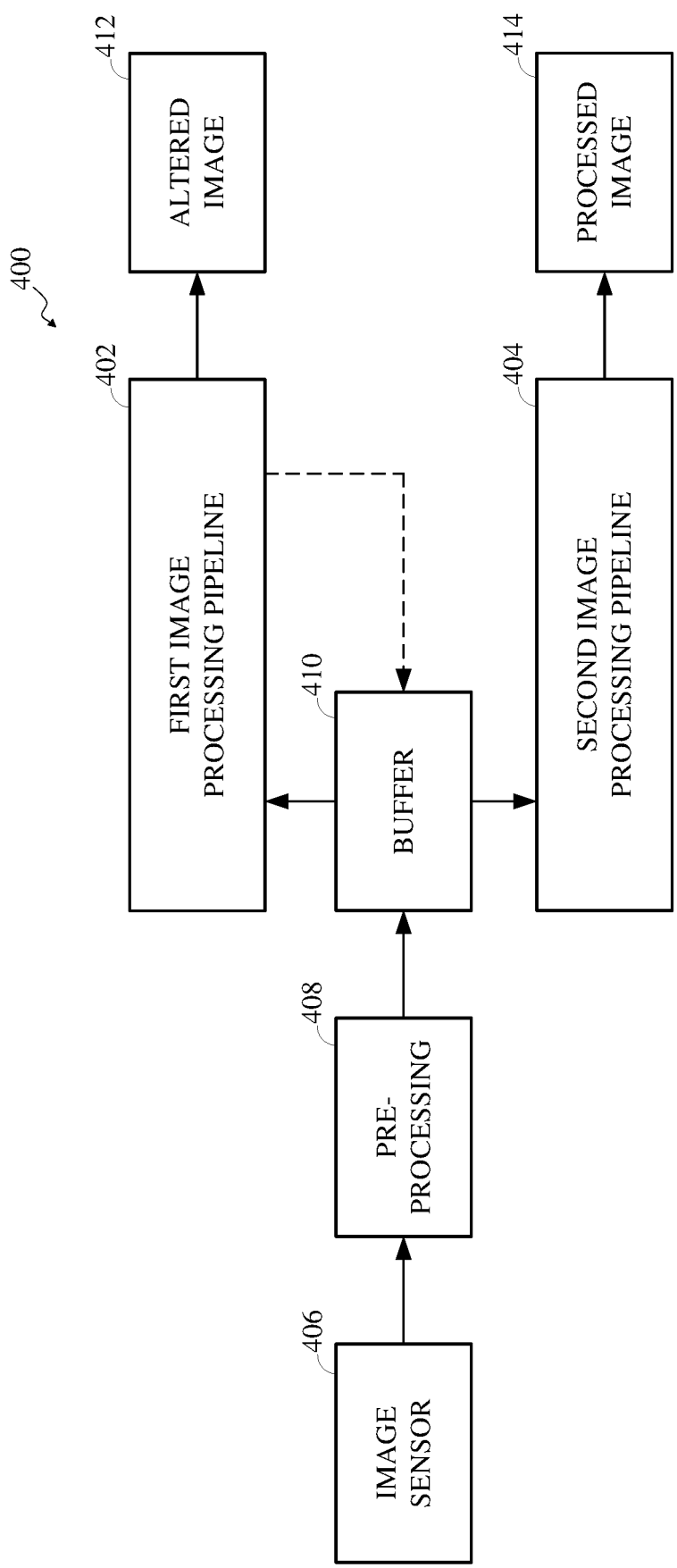
FIG. 4 is a block diagram of an example of components of an image capture device which uses multiple pipelines for image and video processing.

FIG. 4 is a block diagram of an example of components of an image capture device 400 which uses multiple pipelines for image and video processing. The image capture device may, for example, be the image capture device 100 shown in any of FIGS. 1A-D or the image capture device 200 shown in any of FIGS. 2A-C. A first image processing pipeline 402 and a second image processing pipeline 404 are used to process images at the image capture device 400. In some implementations, the first image processing pipeline 402 and the second image processing pipeline 404, individually or in combination, may represent functionality of an integrated circuit, for example, including an image capture unit, an image processing unit, or a combined image capture and processing unit.

The first image processing pipeline 402 and the second image processing pipeline 404 process an image initially captured using an image sensor 406 of the image capture device 400. The image sensor 406 may, for example, be one or more of an image sensor of the image capture device 100, an image sensor of the image capture device 200 (e.g., the image sensor 230 or the image sensor 234 shown in FIGS. 2A-C), an image sensor of the image capture system 300 (e.g., the first image sensor 314 or the second image sensor 316 shown in FIG. 3A), or an image sensor of the image system device 330 (e.g., the image sensor 342 shown in FIG. 3B). In some implementations, the capturing of the image using the image sensor 406 may be responsive to a user of the image capture device 400 indicating to capture an image, for example, by the user interacting with an interface element of the image capture device 400 which causes images to be captured by the image sensor 406. In some implementations, the capturing of the image using the image sensor 406 may be automated based on one or more configurations of the image sensor 406.

The image capture device 400 may include a pre-processing unit 408 which performs pre-processing against the image captured using the image sensor 406, such as before the image is stored in the buffer 410. The pre-processing performed using the pre-processing unit 408 may include one or more of auto-exposure (AE), auto-white balance (AWB), or another pre-processing.

For example, the pre-processing may include obtaining, such by generating or determining, AE control statistics from the captured image. In another example, the pre-processing may include obtaining, such as by generating or determining, AWB control statistics from the captured image. In yet another example, the pre-processing may include obtaining, such as by generating or determining, both AE and AWB control statistics and information from the captured image. In some implementations, the functionality of the pre-processing unit 408 may be expressed as or otherwise represented by processing units. For example, the AE functionality of the pre-processing unit 408 may be expressed as an AE unit. In another example, the AWB functionality of the pre-processing unit 408 may be expressed as an AWB unit.

The image pre-processing control statistics obtained from the captured image may be used to adjust one or more configurations of the image sensor 406. For example, an aperture and/or shutter speed of the image sensor 406 may be adjusted based on the obtained AE control statistics. Alternatively, the image pre-processing control statistics obtained from the captured image may be used to adjust the captured image itself. For example, one or more color temperature changes may be made based on the obtained AWB control statistics. Other types of pre-processing may also or instead be performed using the pre-processing unit 408. In some implementations, the pre-processing unit 408 may be omitted.

The image output by the pre-processing unit 408 (or directly from the image sensor 406, in implementations in which the pre-processing unit 408 is omitted) is stored in a buffer 410. The buffer 410 is included in a memory of the image capture device 400. In some implementations, the buffer 410 may be of a fixed size. In such an implementation, the buffer 410 may be able to store up to a defined maximum number of images captured using the image sensor 406. In some implementations, the buffer 410 may be of a varying size. In such an implementation, memory resources made available for the buffer may be subject to change to enable the buffer 410 to store more or fewer images captured using the image sensor 406.

The first image processing pipeline 402 and the second image processing pipeline 404 interact with the buffer 410 to retrieve images stored therein. The first image processing pipeline 402 and the second image processing pipeline 404 represent software functionality of the image capture device 400. The first image processing pipeline 402 and the second image processing pipeline 404 may be implemented in instructions stored in a memory of the image capture device 400.

The memory which stores the instructions for implementing the first image processing pipeline 402 and the second image processing pipeline 404 may be the same memory as which includes the buffer 410. Alternatively, the memory which stores the instructions for implementing the first image processing pipeline 402 and the second image processing pipeline 404 may be different from the memory which includes the buffer 410. The instructions for implementing the first image processing pipeline 402 and the second image processing pipeline 404 may be executed by a processor of the image capture device 400, such as by the processor reading the instructions from the memory.

The first image processing pipeline 402 retrieves the image captured using the image sensor 406 from the buffer 410 and processes the retrieved image using one or more image processing units to determine image processing control statistics and to produce an altered image 412. The image processing control statistics represent information used to indicate how image data should be processed in the second image processing pipeline 404, such as to enhance the quality of the altered image 412 to restore quality loss imposed during the first image processing pipeline 402. The altered image 412 is stored in the buffer 410 so as to replace the initially captured image therein. The second image processing pipeline 404 retrieves the altered image 412 from the buffer and processes the image data of the altered image 412 according to the image processing control statistics collected at the first image processing pipeline 402 to produce a processed image 414.

The image captured using the image sensor 406 is captured at a high resolution. The first image processing pipeline 402 reduces the resolution to quickly output a processed version of the image. Thus, the altered image 412 represents image data of the image initially captured using the image sensor 406 at a decreased resolution. The first image processing pipeline 402, in processing the image, learns how to enhance it during the second image processing pipeline 404, such as based on the collected image processing control statistics. The second image processing pipeline 404 increases (e.g., by restoring or otherwise increasing) the resolution for high quality output. Thus, the processed image 414 represents image data of the image initially captured using the image sensor 406 at the same or a similar resolution as it was in when initially captured using the image sensor 406.

Separating the image processing into the first image processing pipeline 402 and the second image processing pipeline 404 may have the added benefit of immediate display of low resolution versions of captured images (e.g., as the altered image 412) while high resolution versions of the captured images (e.g., as the processed image 414) are processing. As such, the altered image 412 may be output to a display of the image capture device 400 with zero shutter lag.

Figure 5:
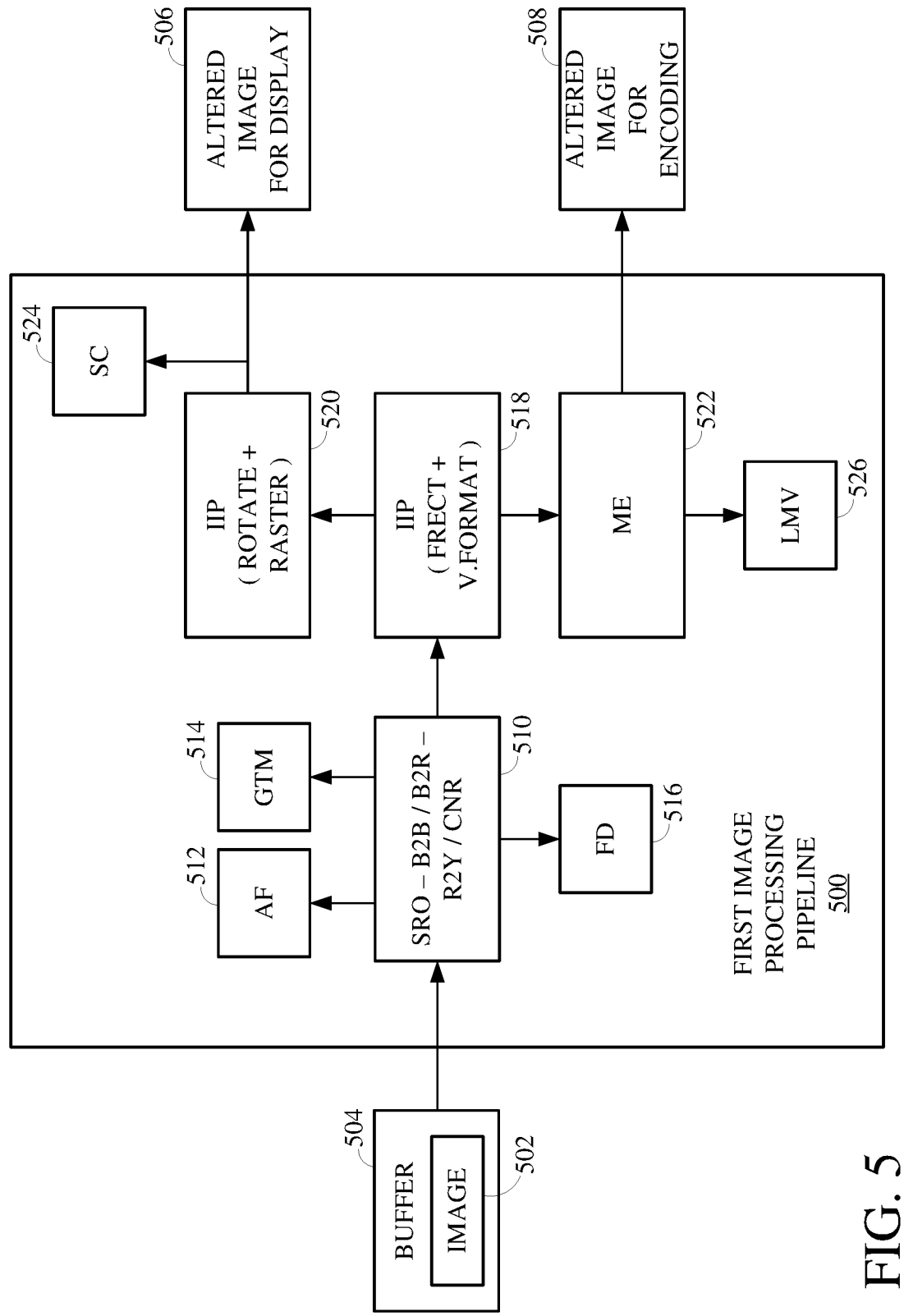
FIG. 5 is a block diagram of an example of a first image processing pipeline.

FIG. 5 is a block diagram of an example of a first image processing pipeline 500, which may, for example, be the first image processing pipeline 402 shown in FIG. 4. The first image processing pipeline 500 processes an image 502 stored in a buffer 504 to produce an altered image, such as an altered image for display 506 or an altered image for encoding 508. The image 502 is an image captured using an image sensor, which may, for example, be the image sensor 406 shown in FIG. 4. The buffer 504 may, for example, be the buffer 410 shown in FIG. 4. The altered image for display 506 or the altered image for encoding 508 may, for example, be the altered image 412 shown in FIG. 4.

The first image processing pipeline 500 includes a sensor read out (SRO)–Bayer-to-Bayer (B2B)/Bayer-to-RGB (B2R)–RGB-to-YUV (R2Y)/chroma noise reduction (CNR) unit 510. In some implementations, the SRO–B2B/B2R–R2Y/CNR unit 510 may be a collection of individual processing units, including a SRO unit, a B2B unit, a B2R unit, a RGB unit, a CNR unit, or a combination thereof. In some implementations, the SRO–B2B/B2R–R2Y/CNR unit 510 may be a single unit which includes the combined functionality of some or all of a SRO unit, a B2B unit, a B2R unit, a RGB unit, or a CNR unit. The following discussion regarding the individual functionality of a SRO unit, a B2B unit, a B2R unit, a RGB unit, or a CNR unit may refer to either such implementation.

A SRO unit of the SRO–B2B/B2R–R2Y/CNR unit 510 may perform dead pixel correction, color lens shading, lateral chromatic processing, Bayer resizing, scaling, or the like, for the image data. The SRO unit may obtain, such as by generating or determining, image processing control statistics, such as auto-focus (AF) control statistics, global tone mapping (GTM) control statistics, facial detection (FD) control statistics, other control statistics, or a combination thereof.

For example, the first image processing pipeline 500 may include processing units used by or otherwise in connection with the processing performed at the SRO–B2B/B2R–R2Y/CNR unit 510. The processing units may include an AF unit 512, a GTM unit 514, and a FD unit 516. The SRO unit of the SRO–B2B/B2R–R2Y/CNR unit 510 may obtain the image processing control statistics from the AF unit 512, the GTM unit 514, and the FD unit 516.

A B2B unit of the SRO–B2B/B2R–R2Y/CNR unit 510 may perform conversion of the image data from a first Bayer format to a second Bayer format. For example, the B2B unit may convert image data of a signed 15-bit Bayer format to an unsigned 14-bit Bayer format. The B2B unit may obtain, such as by generating or determining, high dynamic range tone control statistics based on the image data. The B2B unit may implement denoising.

A B2R unit of the SRO–B2B/B2R–R2Y/CNR unit 510 may perform conversion of the image data from a Bayer format to an RGB format. For example, the B2R unit may convert image data of an unsigned 14-bit Bayer format to an unsigned 14-bit RGB format. The B2R unit may implement white balancing and/or demosaicing.

A R2Y unit of the SRO–B2B/B2R–R2Y/CNR unit 510 may perform conversion of the image data from an RGB format to a YUV format. For example, the R2Y unit may convert image data of an unsigned 14-bit RGB format to an unsigned 10-bit YUV format. The R2Y unit may implement color correction and/or chroma denoising.

A CNR unit of the SRO–B2B/B2R–R2Y/CNR unit 510 may perform chroma noise reduction against the image data. For example, the CNR unit may perform chroma noise reduction against image data of an unsigned 10-bit YUV format. The CNR unit may implement chroma denoising and/or luma denoising.

The first image processing pipeline 500 includes a first initial image processing (IIP) unit 518 which receives the output of the SRO–B2B/B2R–R2Y/CNR unit 510. The first IIP unit 518 includes image reconstruction (e.g., Fourier regularized computed tomography (FRECT)) functionality which may be performed against the output of the SRO–B2B/B2R–R2Y/CNR unit 510. For example, the FRECT functionality of the IIP unit 518 may include performing filtering for computed tomography against the image data, such as based on constraints measured within the Fourier domain. The first IIP unit 518 also includes resolution scaling (e.g., V.FORMAT) functionality which may be performed against the output of the SRO–B2B/B2R–R2Y/CNR unit 510. For example, the V.FORMAT functionality of the IIP unit 518 may include changing resolutions of the image data, such as by decreasing the resolution of the image initially captured using the image sensor of the image capture device implementing the first image processing pipeline 500.

The first image processing pipeline 500 includes two pathways following the processing at the first IIP unit 518. The particular pathway to follow depends on the type of output to produce by the first image processing pipeline 500. To produce the altered image for display 506, the first image processing pipeline 500 follows a first pathway in which a second IIP unit 520 receives the output of the first IIP unit 518. To produce the altered image for encoding 508, the first image processing pipeline 500 follows a second pathway in which a motion estimation (ME) unit 522 receives the output of the first IIP unit 518.

The second IIP unit 520 includes image rotation functionality which may be performed against the output of the first IIP unit 518. For example, some or all of the image data may be rotated according to a geometric mapping or other warping. The second IIP unit 520 also includes image rasterization functionality which may be performed against the output of the first IIP unit 518, such as to convert the image data to a displayable pixel matrix or array. A scene classification (SC) unit 524 detects and identifies a scene category for the image data and post-processes the image data such by improving AWB based on the scene category.

The altered image for display 506 is produced and output from the first image processing pipeline 500 through the first path including the second IIP unit 520 and the SC unit 524. The altered image for display 506 may be output for display, such as at a display of the image capture device which implements the first image processing pipeline 500 or at a display of a different device.

The ME unit 522 detects motion within the image data. The ME unit 522 uses a local motion vector (LMV) unit 526 to determine whether a LMV can be calculated, such as determining or identifying, for the image. In some implementations, where the LMV unit 526 calculates a LMV, the LMV may be compared to a motion threshold. In the event the LMV exceeds the motion threshold, the ME unit 522 may cull the image. In some implementations, where the LMV unit 526 calculates a LMV, the ME unit 522 may cull the image without comparison to a motion threshold or other threshold.

The altered image for encoding 508 is produced and output from the first image processing pipeline 500 through the second path including the ME unit 522 and the LMV unit 526. The altered image for encoding 508 may be output for encoding, such as by an encoding unit of the image capture device which implements the first image processing pipeline 500 or by an encoding unit of a different device.

Figure 6:
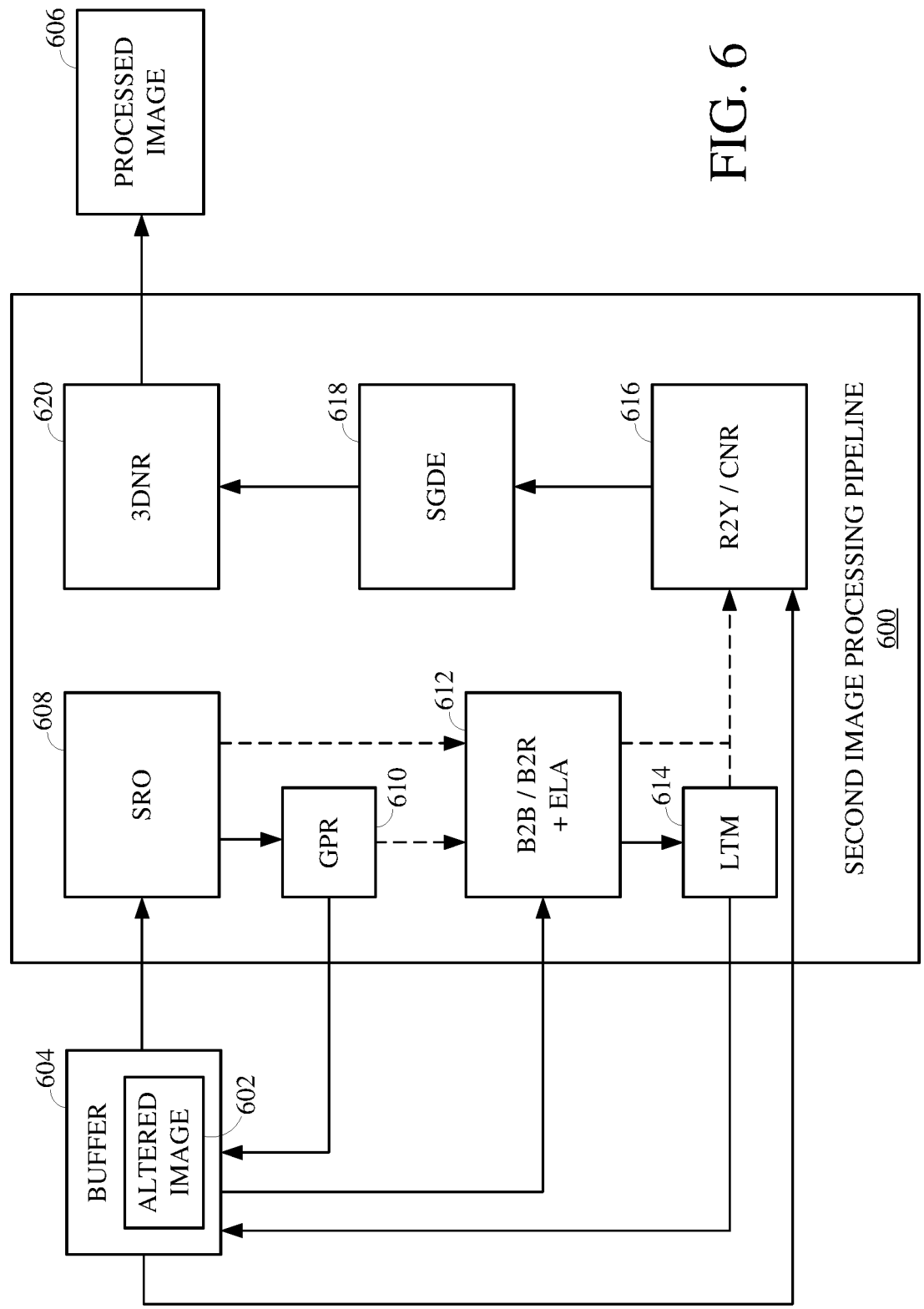
FIG. 6 is a block diagram of an example of a second image processing pipeline.

FIG. 6 is a block diagram of an example of a second image processing pipeline 600, which may, for example, be the second image processing pipeline 404 shown in FIG. 4. The second image processing pipeline 600 processes an altered image 602 stored in a buffer 604 to produce a processed image 606. The altered image 602 is an image initially captured using an image sensor, which may, for example, be the image sensor 406 shown in FIG. 4, which has been altered by a first image processing pipeline, which may, for example, be the first image processing pipeline 402 shown in FIG. 4. The buffer 604 may, for example, be the buffer 410 shown in FIG. 4. The processed image 606 may, for example, be the processed image 414 shown in FIG. 4.

The second image processing pipeline 600 includes a SRO unit 608, which retrieves the altered image 602 from the buffer 604. The SRO unit 608 may perform dead pixel correction, color lens shading, lateral chromatic processing, Bayer resizing, scaling, or the like, for the image data of the altered image 602. The SRO unit 608 may perform such functionality using image processing control statistics obtained by an SRO unit of the first image processing pipeline, for example, as described with respect to the SRO–B2B/B2R–R2Y/CNR unit 510 shown in FIG. 5.

The image data output from the SRO unit 608 may be processed at a Gaussian process regression (GPR) unit 610 of the second image processing pipeline 600. The GPR unit 610 analyzes patterns in the image data processed by the SRO unit 608 using non-parametric, Bayesian regression. For example, the GPR unit may analyze the image processing control statistics used by the SRO to predict further image processing or patterns thereof. The image data processed at the GPR unit 610 is output to the buffer 604.

The second image processing pipeline 600 includes a B2B/B2R+error level analysis (ELA) unit 612, which retrieves the altered image 602 as updated by the SRO unit 608 and the GPR unit 610 from the buffer 604. In some implementations, the B2B/B2R+ELA unit 612 may be a collection of individual processing units, including a B2B unit, a B2R unit, an ELA unit, or a combination thereof. In some implementations, the B2B/B2R+ELA unit 612 may be a single unit which includes the combined functionality of some or all of a B2B unit, a B2R unit, or an ELA unit. The following discussion regarding the individual functionality of a B2B unit, a B2R unit, or an ELA unit may refer to either such implementation.

A B2B unit of the B2B/B2R+ELA unit 612 may perform conversion of the image data from a first Bayer format to a second Bayer format. For example, the B2B unit may convert image data of a signed 15-bit Bayer format to an unsigned 14-bit Bayer format. The B2B unit may obtain, such as by generating or determining, high dynamic range tone control statistics based on the image data. The B2B unit may implement denoising.

A B2R unit of the B2B/B2R+ELA unit 612 may perform conversion of the image data from a Bayer format to an RGB format. For example, the B2R unit may convert image data of a signed 15-bit Bayer format to an unsigned 14-bit RGB format. The B2R unit may implement white balancing and/or demosaicing.

An ELA unit of the B2B/B2R+ELA unit 612 may perform ELA against the image data to measure quality loss resulting from the processing of the image data at the first image processing pipeline. For example, the ELA unit may measure a number or level of artifacts within the image data resulting directly or indirectly from the processing of the image data at one or more processing units of the first image processing pipeline.

The image data output from the B2B/B2R+ELA unit 612 may be processed at a local tone mapping (LTM) unit 614 of the second image processing pipeline 600. The image data output to the LTM unit 614 may be unsigned 10-bit YUV image data. The LTM unit 614 may enhance detail and may omit introducing artifacts. For example, the LTM unit 614 may apply tone mapping, which may be similar to applying an unsharp-mark. The image data processed at the LMT unit 614 is output to the buffer 604.

In some implementations, the B2B/B2R+ELA unit 612 may receive the output of the GPR unit 610 directly from the GPR unit 610. For example, the processed image data may be received at the B2B/B2R+ELA unit 612 from the GPR unit 610 without first being stored in the buffer 604. In some implementations, the GPR unit 610 may be omitted. For example, the processed image data may be received at the B2B/B2R+ELA unit 612 from the SRO unit 608. The processed image data received at the B2B/B2R+ELA unit 612 from the SRO unit 608 may be retrieved from the buffer 604. Alternatively, the processed image data received at the B2B/B2R+ELA unit 612 from the SRO unit 608 without first being stored in the buffer 604.

The second image processing pipeline 600 includes a R2Y/CNR unit 616, which retrieves the altered image 602 as updated by the B2B/B2R+ELA unit 612 and the LTM unit 614 from the buffer 604. In some implementations, the R2Y/CNR unit 616 may be a collection of individual processing units, including a R2Y unit, a CNR unit, or a combination thereof. In some implementations, the R2Y/CNR unit 616 may be a single unit which includes the combined functionality of some or all of a R2Y unit or a CNR unit. The following discussion regarding the individual functionality of a R2Y unit or a CNR unit may refer to either such implementation.

A R2Y unit of the R2Y/CNR unit 616 may perform conversion of the image data from an RGB format to a YUV format. For example, the R2Y unit may convert image data of an unsigned 14-bit RGB format to an unsigned 10-bit YUV format. The R2Y unit may implement color correction and/or chroma denoising.

A CNR unit of the R2Y/CNR unit 616 may perform chroma noise reduction against the image data. For example, the CNR unit may perform chroma noise reduction against image data of an unsigned 10-bit YUV format. The CNR unit may implement chroma denoising and/or luma denoising.

In some implementations, the R2Y/CNR unit 616 may receive the output of the LTM unit 614 directly from the LTM unit 614. For example, the processed image data may be received at the R2Y/CNR unit 616 from the LTM unit 614 without first being stored in the buffer 604. In some implementations, the LTM unit 614 may be omitted. For example, the processed image data may be received at the R2Y/CNR unit 616 from the B2B/B2R+ELA unit 612. The processed image data received at the R2Y/CNR unit 616 from the B2B/B2R+ELA unit 612 may be retrieved from the buffer 604. Alternatively, the processed image data received at the R2Y/CNR unit 616 from the B2B/B2R+ELA unit 612 without first being stored in the buffer 604.

The second image processing pipeline 600 includes a smart geometrical distortion engine (SGDE) unit 618. Maps the image data from a form within the input received at the SGDE unit 618 to a form in preparation for output as a two-dimensional image. Mapping the image data using the SGDE unit 618 can include geometrically warping all or a portion of the image data from an input image space to an output image space. For example, the warping can include performing an affine, homographic, or other transformation or translation of image data. In some implementations in which the image is a 360 degree image, the SGDE unit 618 can map the image data by warping the image data to a spherical projection.

The second image processing pipeline 600 includes a three-dimensional noise reduction (3DNR) unit 620. The 3DNR unit 620 may receive image data output from the SGDE unit 618, such as in the unsigned 10-bit YUV format or otherwise. The 3DNR unit 620 performs three-dimensional noise reduction against the image data, such as by reducing noise within the image based on image noise reduction processing for one or more previously processed images and/or based on image noise reduction processing performed at the first image processing pipeline to produce the altered image 602.

The processed image 606 may be output for display or for further processing. For example, the processed image 606 may be output to a display of the image capture device implementing the second image processing pipeline 600 or to a display of a different device. In another example, the processed image 606 can be output for encoding, such as by an encoding unit of the image capture device or by an encoding unit of a different device.

Figure 7:
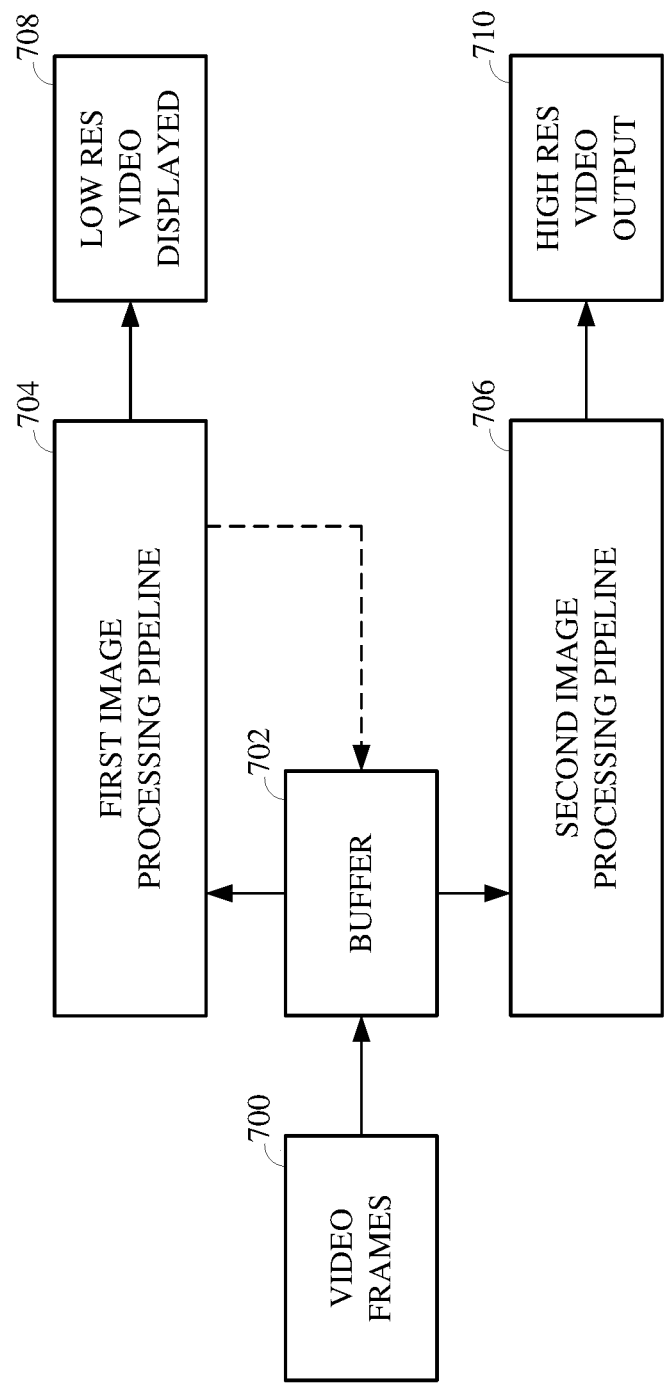
FIG. 7 is a block diagram of example functionality for live streaming video content using multiple image processing pipelines.

Details of implementations and examples of image and video functionality which may be performed using the systems and pipelines described with respect to FIGS. 1-6 are now described. FIG. 7 is a block diagram of example functionality for live streaming video content using multiple image processing pipelines, for example, the pipelines described above with respect to FIGS. 4-6. Live streaming video content using multiple image processing pipelines according to the implementations of this disclosure can include processing video frames of video content at a first image processing pipeline to display a low resolution video at a display of the image capture device (e.g., for viewing by the person live streaming the video content) in real time with the recording itself and then processing the video content at a second image processing pipeline using information learned about the video frames at the first image processing pipeline to produce high resolution video output, such as for display or further processing.

Video frames 700, which are images captured using an image sensor (e.g., the image sensor 406 shown in FIG. 4), are stored in a buffer 702 (e.g., the buffer 410 shown in FIG. 4) and processed at each of a first image processing pipeline 704 (e.g., the first image processing pipeline 402 shown in FIG. 4) and a second image processing pipeline 706 (e.g., the second image processing pipeline 404 shown in FIG. 4). The first image processing pipeline 704 processes the video frames 700, such as individually, to produce a low resolution video displayed 708, such as at a display of the image capture device implementing the first image processing pipeline 704.

The altered video frames output by the first image processing pipeline 704 are then stored in the buffer 702 and retrieved for the second image processing pipeline 706. The second image processing pipeline 706 uses control statistics collected for the video frames 700 during the processing thereof at the first image processing pipeline 704 to enhance the altered video frames to a higher resolution and produce and output the high resolution video output 710. In this way, the low resolution video displayed 708 is output for display immediately, such as in real-time, at the image capture device for immediate viewing by the person live streaming the video content, while the high resolution video output 710 is produced very shortly thereafter.

Figure 8:
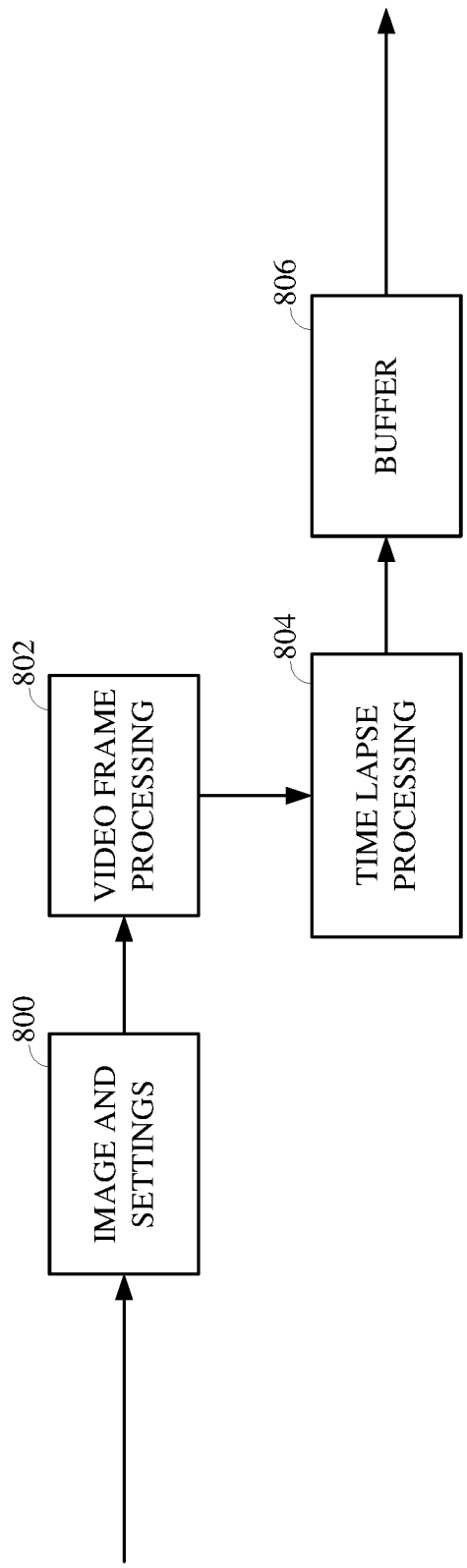
FIG. 8 is a block diagram of example functionality for image and video timewarp using multiple image processing pipelines.

FIG. 8 is a block diagram of example functionality for image and video timewarp using multiple image processing pipelines, for example, the pipelines described above with respect to FIGS. 4-6. Image and video timewarp using multiple image processing pipelines according to the implementations of this disclosure can include using images and settings defined, such as by a user of an image capture device, to time lapse the images as video frames of a timewarp video and then storing those time lapsed images within a buffer for further processing and output.

Image and settings input 800 includes an images, which are images captured using an image sensor (e.g., the image sensor 406 shown in FIG. 4), and settings defined by a user of the image capture device or by default configurations thereof. The settings may, for example, indicate or refer to a desired amount of stabilization, a length of activity engagement, a video length, or the like. The images undergo video frame processing 802 using one or more image processing units, for example, image processing units of the first image processing pipeline 402 shown in FIG. 4.

The processed images, as video frames, then undergo time lapse processing 804 according to the settings of the image and settings input 800. The time lapse processing 804 includes scaling the timing of the video frame input to achieve the desired timewarp effect. The time lapsed video frames are then stored in a buffer 806 (e.g., the buffer 410 shown in FIG. 4) at a decreased and are later retrieved at a second image processing pipeline, which increases the resolution thereof and outputs the increased resolution video frames for display or further processing.

Figure 9:
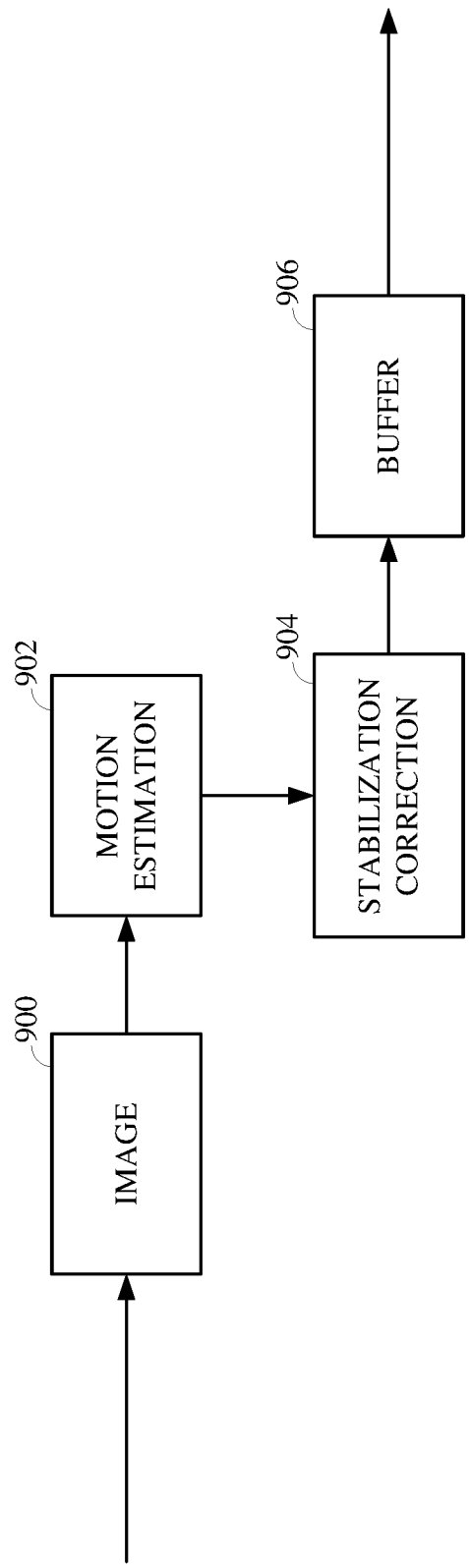
FIG. 9 is a block diagram of example functionality for image and video stabilization using multiple image processing pipelines.

FIG. 9 is a block diagram of example functionality for image and video stabilization using multiple image processing pipelines, for example, the pipelines described above with respect to FIGS. 4-6. Video stabilization using multiple image processing pipelines according to the implementations of this disclosure can include processing an image to understand motion elements of it including unintended motion caused by undesired movements of an image capture device (e.g., based on vibrational or other forces acting upon the image capture device) and compensating the image data to remove those motion elements therefrom.

An image 900, which is an image captured using an image sensor (e.g., the image sensor 406 shown in FIG. 4), is processed by motion estimation 902 (e.g., using the motion estimation unit 522 of the first image processing pipeline 500 shown in FIG. 5) to identify motion elements such as artifacts and motion-induced noise within the image 900. The information obtained from the motion estimation 902 is used for stabilization correction 904.

Stabilization correction 904 may, for example, include reducing or eliminating the motion elements identified by the motion estimation 902. For example, the stabilization correction 904 may include filtering the image data of the image 900 based on motion vector data or other motion information to reduce the artifacts and motion-induced noise within then image 900. The image 900 is then stored in a buffer 906 (e.g., the buffer 410 shown in FIG. 4) for further processing, such as at a second image processing pipeline. In some implementations, the stabilization correction 904 may include mechanical control of a gimbal or other mechanical element coupled to the image capture device.

Figure 10:
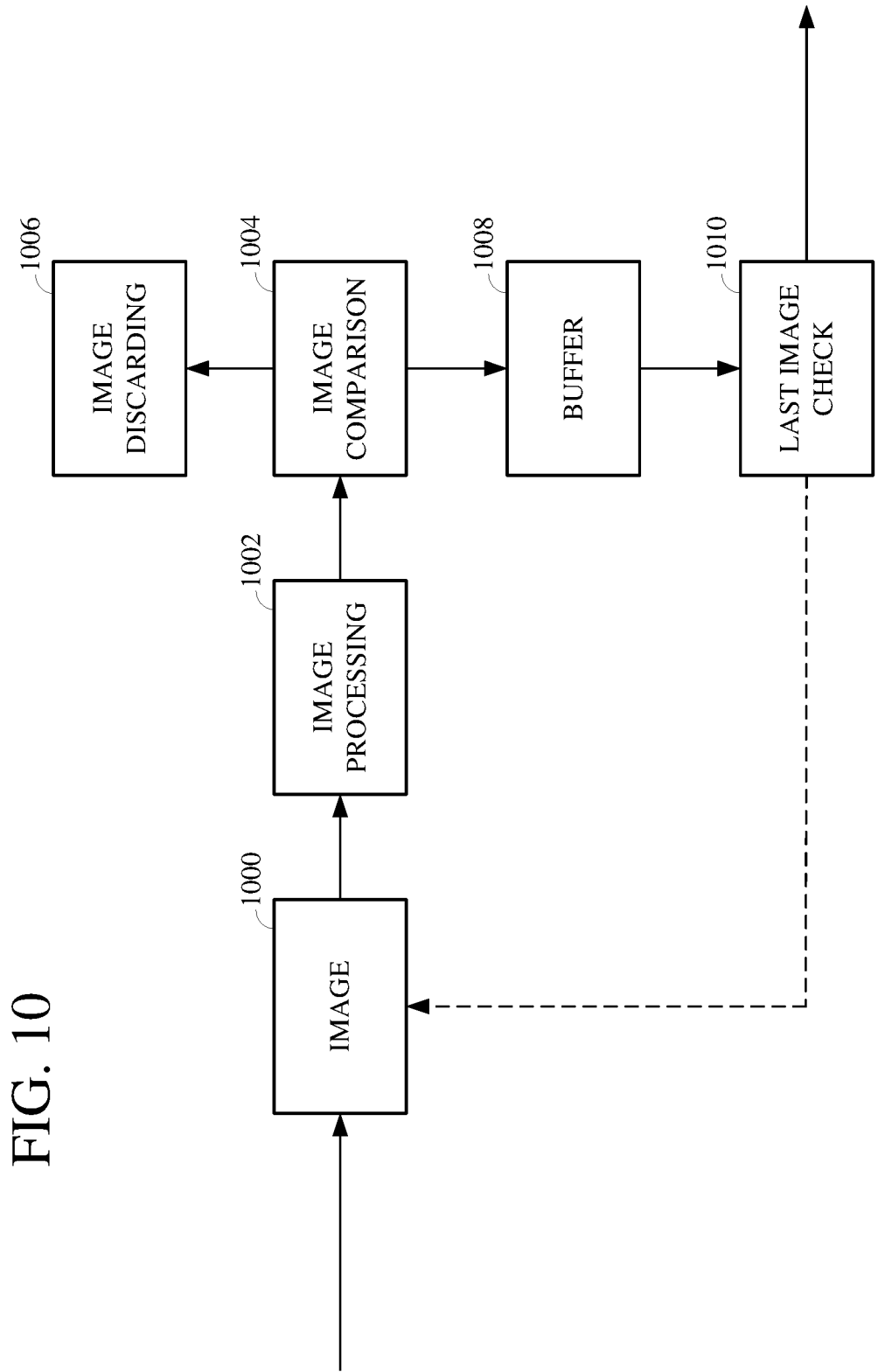
FIG. 10 is a block diagram of example functionality for burst image processing using multiple image processing pipelines.

FIG. 10 is a block diagram of example functionality for burst image processing using multiple image processing pipelines, for example, the pipelines described above with respect to FIGS. 4-6. Burst image processing using multiple image processing pipelines according to the implementations of this disclosure can include selecting an optimal image of the burst image set during a first image processing pipeline and storing that image for further processing at a second image processing pipeline.

An image 1000, which is one image of the burst image set and an image captured using an image sensor (e.g., the image sensor 406 shown in FIG. 4), is processed using one or more image processing units 1002. The image processing units 1002 may, for example, be image processing units of the first image processing pipeline 402 shown in FIG. 4. An image comparison 1004 is then performed by comparing a quality measure of the image 1000 against a previous image of the burst image set. In the event the quality measure of the image 1000 is equal to or lower than that of the previous image of the burst image set, image discarding 1006 is performed to cull the image 1000 from further processing.

In the event the quality measure of the image 1000 is greater than that of the previous image of the burst image set, the image 1000 is stored in the buffer 1008, which may, for example, be the buffer 410 shown in FIG. 4. A last image check 1010 is then performed to determine whether other images of the burst image set remain to be processed. If so, the next image 1000' (not shown) is selected and the process is repeated. If not, the image 1000 stored in the buffer 1008 is used as the altered image retrieved for processing at the second image processing pipeline.

Further details of implementations and examples of techniques performed using the systems and pipelines described with respect to FIGS. 1-10 are now described. FIG. 11 is a flowchart showing an example of a technique 1100 for image and video processing using multiple pipelines. FIG. 12 is a flowchart showing an example of a technique 1200 for image and video processing performed at a first image processing pipeline. FIG. 13 is a flowchart showing an example of a technique 1300 for image and video processing performed at a first image processing pipeline.

The technique 1100, the technique 1200, and/or the technique 1300 can be performed, for example, using hardware and/or software components of an image capture system, such as the image capture device 100 shown in FIGS. 1A-D or the image capture device 200 shown in FIG. 2. For example, the image capture device 100 or the image capture device 200 may include one or more software components that process an image captured using an image capture device of the image capture device 100 or the image capture device 200, for example, to perform image and video processing using multiple pipelines.

In another example, the technique 1100, the technique 1200, and/or the technique 1300 can be performed using an integrated circuit. The integrated circuit may, for example, be a field programmable gate array (e.g., FPGA), programmable logic device (PLD), reconfigurable computer fabric (RCF), system on a chip (SoC), ASICs, and/or another type of integrated circuit. An image processor of the integrated circuit includes a camera mode selection unit and/or an image capture unit (e.g., a processor having one or multiple cores) configured to execute instructions to perform some or all of the technique 1100, the technique 1200, and/or the technique 1300.

Although the technique 1100, the technique 1200, and the technique 1300 are each described with respect to a series of operations, the operations comprising the technique 1100, the technique 1200, and/or the technique 1300 may be performed in orders other than those described herein. In some implementations, the technique 1100, the technique 1200, and/or the technique 1300 may include additional, fewer, or different operations than as described herein.

Referring first to FIG. 11, an example of the technique 1100 for image and video processing using multiple pipelines is shown. At 1102, an image is captured using an image sensor of an image capture device. The image is captured at a first resolution generally considered of high quality. In some implementations, the image may be a 360 degree image. In such an implementation, the 360 degree image is captured using multiple image sensors of a plurality of image sensors of the image capture device.

At 1104, the image is pre-processed using one or more image pre-processing units to collect image pre-processing control statistics. The pre-processing units may include one or both of an AE unit or an AWB unit. Pre-processing the image can include collecting image pre-processing control statistics, which may be used to adjust one or more configurations of the image sensor, such as for capturing subsequent images using the adjusted configurations. In some implementations, the pre-processing may be omitted or otherwise skipped.

At 1106, after the pre-processing is performed (or, in implementations in which the pre-processing is omitted or otherwise skipped, without performing the pre-processing), the image is stored in a buffer in a memory of the image capture device. The buffer may represent a fixed or variable space in the memory of the image capture device.

At 1108, the image is retrieved from the buffer and processed at a first image processing pipeline to produce an altered image. The first image processing pipeline includes image processing units used to convert, denoise, reconstruct, scale the resolution of, and otherwise process the image to produce the altered image. Thus, the altered image has a resolution which is lower than the resolution of the initially captured image. Implementations and examples of a technique for processing the image at the first image processing pipeline are described below with respect to FIG. 12. The altered image is output from the first image processing pipeline.

At 1110, the image is replaced with the altered image within the buffer. In some implementations, the replacing of the image may be performed as part of the first image processing pipeline. In some implementations, the replacing of the image may be performed as a post-processing operation following the completion of the first image processing pipeline.

At 1112, the altered image is retrieved from the buffer and processed at a second image processing pipeline to produce a processed image. The second image processing pipeline includes image processing units used to convert, denoise, enhance, and otherwise process the altered image to produce the processed image. Thus, the processed image has a resolution which is higher than the resolution of the altered image. In some implementations, the resolution of the processed image may be the same resolution as the resolution of the initially captured image. In some implementations, the resolution of the processed image may be lower or higher than the resolution of the initially captured image.

At 1114, the processed image is output for display or further processing. In some implementations, the processed image may be output to a display of the image capture device and/or a display of a different device (e.g., an external device connected to the image capture device over a network). In some implementations, the processed image may be a video frame to be further processed in connection with a video being captured using the image capture device.

Referring next to FIG. 12, an example of the technique 1200 for image and video processing performed at a first image processing pipeline is shown. At 1202, an image is retrieved from a buffer of an image capture device. The image may be an image stored within the buffer after being captured using an image sensor of the image capture device. In some implementations, the image may be stored in the buffer after undergoing pre-processing, such as using one or more image pre-processing units.

At 1204, image processing control statistics for the image are collected. The image processing control statistics represent information useful to adjust one or more aspects of image data of the image. The image processing control statistics may include, for example, histogram data collected for AF, GTM, FD, or other purposes. The image processing control statistics may be obtained for the purpose of understanding the image data of the image before the image is further processed at the first image processing pipeline.

At 1206, the image data is reconstructed and scaled. Reconstructing the image data can include performing filtering for computed tomography against the image data, such as based on constraints measured within the Fourier domain. Scaling the image data can include decreasing the resolution of the image initially captured using the image sensor of the image capture device.

At 1208, a determination is made as to whether the image being processed at the first image processing pipeline is intended for display or for encoding. At 1210, responsive to a determination that the image is intended for display, the image data is further processed for display, such as by rotating, rasterizing, and scene classifying the image data. At 1212, responsive to a determination that the image is intended for encoding, the image data is further processed for encoding, such as by performing motion estimation using a calculated local motion vector for the image data.

At 1214, an altered image produced for display or for encoding is output along with related data. The manner of outputting is based on the purpose of the altered image. For example, where the altered image is produced for display, outputting the altered image can include outputting the altered image to a display. In another example, where the altered image is produced for encoding, outputting the altered image can include outputting the altered image to an encoding component of the image capture device or of another device.

In either case, the altered image is also output to the buffer, such as to replace the initially captured image stored therein. The related data may, for example, refer to or include the image processing control statistics determined for the image. For example, the image processing control statistics may be stored in the buffer along with the altered image.

Referring next to FIG. 13, an example of the technique 1300 for image and video processing performed at a first image processing pipeline is shown. At 1302, an altered image is retrieved from a buffer. The altered image may be an altered version of an image captured using an image sensor of the image capture device, which is stored in the buffer after processing at a first image processing pipeline.

At 1304, image processing control statistics collected at the first image processing pipeline are applied to the image data of the altered image. Applying the image processing control statistics to the image data includes modifying at least some of the image data. For example, modifying image data based on the image processing control statistics can include using the image processing control statistics to understand how to improve the quality of the image data. The modifications can be performed by, for example, dead pixel correction, color lens shading, lateral chromatic processing, Bayer resizing, scaling, or other processing based on the image processing control statistics.

At 1306, the image data is converted from a first format to a second format, for example, to accommodate high dynamic range output. For example, converting the image data can include converting the image data of the altered image from a signed Bayer format to an unsigned Bayer format, converting the image data from the unsigned Bayer format to an unsigned RGB format, and converting the image data from the unsigned RGB format to an unsigned YUV format.

At 1308, the converted image data is denoised. Denoising the image data can include removing chroma noise, luma noise, or both from the image data.

At 1310, the denoised image data is warped by performing geometrical distortion mapping against the image data. Warping the denoised image data can include applying a transformation or translation against some or all of the image data, such as according to a geometric mapping based on geometric distortion.

At 1312, the mapped image data is further noise reduced by performing 3DNR. Performing 3DNR can include reducing noise within the image data based on image noise reduction processing for one or more previously processed images and/or based on image noise reduction processing performed at the first image processing pipeline to produce the altered image.

At 1314, the processed image is output for display or for further processing. For example, the processed image may be output to a display of the image capture device implementing the second image processing pipeline or to a display of a different device. In another example, the processed image can be output for encoding, such as by an encoding unit of the image capture device or by an encoding unit of a different device.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C #, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An image capture device, comprising:
    an image sensor configured to capture an image at a first resolution;
    a memory configured to store instructions; and
    a processor configured to execute the instructions to:
        determine control statistics from the image;
        produce an altered image representative of the image at a second resolution that is lower than the first resolution;
        output the altered image for display or further processing;
        produce, according to the control statistics, a processed image representative of the image at the first resolution; and
        output the processed image for display or further processing.

2. The image capture device of claim 1, further comprising a display, wherein the instructions to output the altered image for display or further processing include instructions to:
    output the altered image to the display of the image capture device.

3. The image capture device of claim 2, wherein the altered image is output to the display of the image capture device before the processed image is output for display or further processing.

4. The image capture device of claim 1, further comprising a network interface, wherein the instructions to output the processed image for display or further processing include instructions to:
    encode the processed image; and
    transmit, using the network interface, the encoded processed image for decoding and display at a computing device.

5. The image capture device of claim 4, wherein the processed image is a video frame of a video streamed from the image capture device to the computing device.

6. The image capture device of claim 1, wherein the memory includes a buffer, and wherein the instructions include instructions to:
    store the image within the buffer after the image is captured; and
    retrieve the image from the buffer after the control statistics are determined.

7. A method, comprising:
    obtaining an image captured using an image sensor;
    using one or more first processes to determine control statistics and to produce an altered image representing the image at a first resolution;
    outputting the altered image for display or further processing;
    using one or more second processes to produce a processed image representing the image at a second resolution according to the control statistics; and
    outputting the processed image for display or further processing.

8. The method of claim 7, further comprising:
    storing the image within a buffer after obtaining the image,
    wherein using the one or more first processes comprises retrieving the image from the buffer, and wherein using the one or more second processes comprises retrieving the image from the buffer.

9. The method of claim 8, wherein the processed image represents the altered image instead of the image, wherein using the one or more first processes comprises storing the altered image within the buffer to replace the image, and wherein using the one or more second processes comprises retrieving the altered image from the buffer.

10. The method of claim 8, wherein using the one or more first processes comprises storing the control statistics in the buffer, and wherein using the one or more second processes comprises retrieving the control statistics from the buffer.

11. The method of claim 7, wherein the image is a video frame of a timewarp video, wherein using the one or more first processes comprises:
    scaling a timing of the video frame to achieve a desired timewarp effect.

12. The method of claim 7, wherein the control statistics include information indicating motion elements of the image, and wherein using the one or more second processes comprises:
    performing stabilization correction against the altered image according to the information indicating the motion elements of the image.

13. The method of claim 7, wherein the image is an image of a burst image set, wherein using the one or more first processes comprises:
    determining quality measures for at least some of the images of the burst image set; and
    determining that the image has a highest quality measure of the quality measures.

14. The method of claim 7, wherein outputting the altered image for display or further processing comprises:
    outputting the altered image for display with zero shutter lag.

15. An image processor, comprising:
    one or more first processing units configured to process an image to determine control statistics and to produce an altered image at a first resolution for display at an image capture device; and
    one or more second processing units configured to process the image using the control statistics to produce a processed image at a second resolution for further processing at the image capture device, wherein the second resolution is higher than the first resolution.

16. The image processor of claim 15, wherein, to process the image, the one or more first processing units are configured to determine whether the image is intended for display or encoding.

17. The image processor of claim 16, wherein the one or more first processing units are further configured to:
    responsive to a determination that the image is intended for encoding, perform motion estimation against at least a portion of the image.

18. The image processor of claim 15, wherein, to process the image, the one or more second processing units are configured to modify the image according to the control statistics.

19. The image processor of claim 18, wherein modifications to the image according to the control statistics include one or more of dead pixel correction, color lens shading, lateral chromatic processing, Bayer resizing, or scaling.

20. The image processor of claim 15, wherein the one or more second processing units are configured to produce the processed image based on the altered image instead of the image, wherein at least one of the one or more first processing units are configured to store the altered image in a buffer after the altered image is produced using the one or more first processing units, and wherein at least one of the one or more second processing units are configured to retrieve the altered image from the buffer before the altered image is processed using the one or more second processing units.

\* \* \* \* \*